United States Patent
Wirth et al.

(10) Patent No.: US 6,863,277 B2
(45) Date of Patent: Mar. 8, 2005

(54) PISTON RING FOR THE PISTON OF A VIBRATION DAMPER

(75) Inventors: Peter Wirth, Schonungen (DE); Gerald Fenn, Poppenhausen (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/259,036

(22) Filed: Sep. 27, 2002

(65) Prior Publication Data

US 2003/0062687 A1 Apr. 3, 2003

(30) Foreign Application Priority Data

Sep. 28, 2001 (DE) .......................................... 101 48 048
Apr. 19, 2002 (DE) .......................................... 101 17 650

(51) Int. Cl.$^7$ .................................................. F16J 9/00
(52) U.S. Cl. ........................................ 277/434; 277/496
(58) Field of Search ................................ 277/434, 435, 277/436, 437, 438, 439, 493, 494, 495, 496, 497, 498, 499, 548; 188/322.15, 322.22, 312, 317, 280, 282.1, 322.18

(56) References Cited

U.S. PATENT DOCUMENTS

| | | | | |
|---|---|---|---|---|
| 2,415,594 A | * | 2/1947 | Jessup ........................ 277/451 |
| 2,785,026 A | * | 3/1957 | Barnhart .................... 277/438 |
| 3,473,814 A | * | 10/1969 | Baslow ........................ 277/562 |
| 3,583,712 A | * | 6/1971 | Domros et al. ............. 277/440 |
| 3,920,252 A | * | 11/1975 | Dechavanne ................. 277/437 |
| 4,109,924 A | * | 8/1978 | Stucke ........................ 277/468 |
| 4,484,512 A | * | 11/1984 | Dechavanne ................. 92/243 |
| 4,875,405 A | * | 10/1989 | Bernhardt et al. ............ 92/194 |
| 5,611,260 A | * | 3/1997 | Kanari et al. ................. 92/248 |
| 5,937,976 A | * | 8/1999 | Grundei ................. 188/322.15 |
| 6,003,227 A | * | 12/1999 | Deppert et al. ........ 29/888.072 |
| 6,186,512 B1 | * | 2/2001 | Deppert et al. ............. 277/434 |
| 6,397,987 B1 | * | 6/2002 | Pesch et al. ........... 188/322.22 |
| 6,540,052 B2 | * | 4/2003 | Fenn et al. ............ 188/322.15 |

FOREIGN PATENT DOCUMENTS

| | | | |
|---|---|---|---|
| DE | 197 07 633 C1 | 7/1998 | ............. F16F/9/36 |
| DE | 198 20 405 A1 | 11/1999 | ............. F16J/9/00 |
| FR | 683008 | 12/1966 | |

* cited by examiner

*Primary Examiner*—Thomas B. Will
*Assistant Examiner*—Vishal Patel
(74) *Attorney, Agent, or Firm*—Cohen, Pontani, Lieberman & Pavane (57) ABSTRACT

A piston ring for the piston of a vibration damper includes a jacket and supporting segments connected to the jacket with holding surfaces. The supporting segments are supported axially on an upper side and a lower side of the piston by the holding surfaces. The piston ring has a seal carrier in which at least one seal is embedded, wherein the seal is oriented toward the piston proceeding from the seal carrier.

8 Claims, 6 Drawing Sheets

PISTON RING FOR THE PISTON OF A VIBRATION DAMPER

BACKGROUND OF THE INVENTION

1. Field of the Invention

The invention is directed to a piston ring for a piston of a piston-cylinder unit such as a vibration damper.

2. Description of the Related Art

Flat pistons for vibration damper piston-cylinder units in which a piston ring surrounding a piston has a substantially U-shaped cross section are known from the prior art. The piston ring forms a jacket which seals a gap between the piston and an inner wall of a cylinder of the vibration damper. Supporting surfaces of the piston ring serve to secure the piston ring axially on the top and bottom of the piston, respectively. The piston ring is often made from a rigid plastic so that radial pretensioning may be achieved between the piston ring and the inner wall. A slight gap between the piston and piston ring in the area of the circumferential surface of the piston typically exists because the dimensional tolerances of the cylinder and piston must be balanced.

In a flat piston disclosed, for example, in DE 197 07 633, massive deformation processes may cause inaccuracies in the shape of the piston ring so that the supporting surfaces of the piston ring no longer make full surface contact with the top and bottom of the piston. This may lead to the occurrence of small leakage gaps between the top and bottom of the piston and has a negative impact particularly in vibration dampers for so called sport car designs which require precise damping characteristics in that the flow connections which are subject to tolerances generate variations in damping force.

One possible solution consists in readjusting the piston in a final work step to eliminate the dimensional inaccuracy. Although this yields measurably successful results, it is still not sufficient. Further, the tolerances at the piston ring are limited, but at the expense of a disproportionate increase in manufacturing costs with only a small reduction in the permissible manufacturing tolerances.

The reference cited above describes the possibility of sealing the gap between the jacket of the piston ring and the inner wall of the cylinder by a seal integrated in a seal carrier.

SUMMARY OF THE INVENTION

An object of the present invention is to minimize a leakage gap between an inner side of a piston ring and a piston and minimize costs.

According to the present invention, the object is met by installing a seal on the piston ring oriented toward the piston proceeding from a seal carrier on the piston ring.

A drastic reduction in the leakage gap is achieved by this step without changing existing tolerances, such that the resulting leakage gap of the present invention does not exert a significant influence on the desired damping forces.

In one embodiment of the present invention, the seal contacts the upper side and/or the lower side of the piston.

The seal may extend from the inner diameter of holding surfaces of the seal carrier. A seal, e.g., in the form of a sealing lip whose pretensioning can be further increased by the operating pressure, may be arranged at this location in a simple manner.

Alternatively, the seal may be arranged on the inner side at the seal carrier at the transition from a holding surface to a jacket portion of the piston ring. In addition to its sealing function, the seal may also compensate for an axial play of the seal carrier relative to the piston.

The seal carrier may, for example, have a shoulder in the area of the supporting element at the transition from the holding surface to the inner diameter of the supporting element. The shoulder is preferably circumferential and its radial and axial defining surfaces determine the shape of an injected seal material of the seal.

The seal may be connected with the seal carrier by a material bond, depending on the material of the seal carrier. No special geometries are required at the seal carrier or at the seal.

Alternatively, the seal may be connected with the seal carrier by positive engagement. In this case, a wider selection of materials is available.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
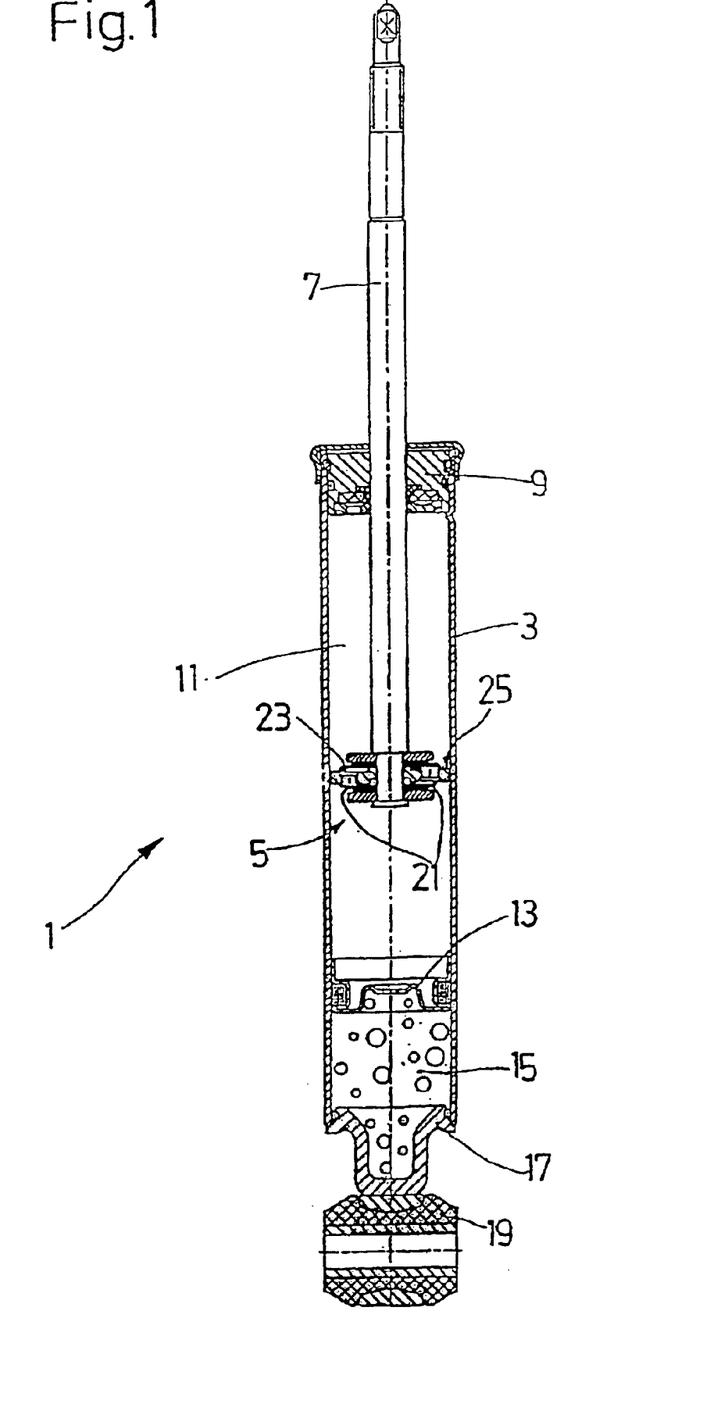
FIG. 1 is a longitudinal sectional view of a vibration damper in which the present invention is implemented.

FIG. 1 shows a monotube vibration damper 1 as an example of a piston-cylinder unit in which the present invention may be implemented. In principle, the present invention may also be used in other piston-cylinder units.

The monotube vibration damper 1 comprises a pressure tube 3 in which a piston 5 is arranged at an end of a piston rod 7 so that the piston 5 is axially movable in the pressure tube 3. A piston rid guide 9 is arranged in the pressure tube 3 at the outlet side of the piston rod 7 and closes a work space 11 which is filled with damping medium. The work space 11 is separated from a gas chamber 15 in the pressure tube 3 by a dividing piston 13. The bottom 17 of the pressure tube 3 is connected with an eye 19.

During movement of the piston rod 7, damping medium is displaced through damping valves 21 in the piston 5 which are formed by valve disks 23. A piston ring 25; covers an outer circumferential surface of the piston 5 to prevent lateral flow of the damping medium around the piston 5.

Figure 2:
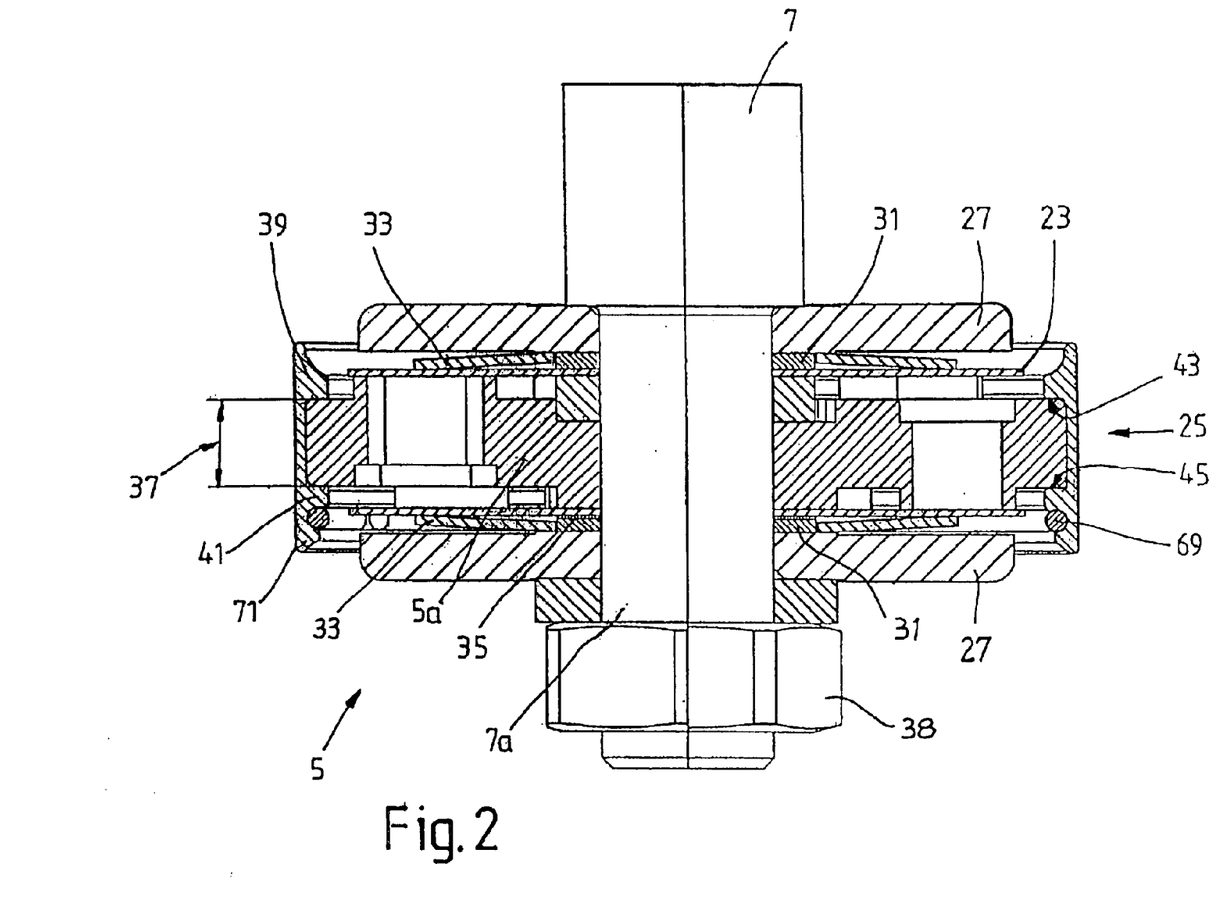
FIG. 2 is a detailed sectional view of a piston of the piston-cylinder unit of FIG. 1.

FIG. 2 shows the piston 5 mounted on the piston rod 7 with a supporting disk 27 and a centering sleeve 31 arranged at each opposing end of the piston S. Each of the piston 5, the supporting disks 27 and the centering sleeves 31 are centered at a piston rod journal 7a of the piston rod 7. The piston 5 includes a valve disk 23 and a disk spring 33 centered at each centering sleeve 31. A piston body 5a of the piston and the piston ring 25 are also centered at the piston rod journal 7a. A spring element 35 such as, for example, a wave spring is placed on the piston body 5a. The spring element 35 has only a very small spring rate and/or spring force because it is only required to carry the centering sleeve 31 for this side of the piston 5. Its height is dimensioned such that an overlap is exhibited between the valve disk 23 and centering sleeve 31. The disk spring 33 may also be oriented at the centering sleeve 31. In a preferred embodiment, the centering sleeves 31 have the same height on both sides of the piston 5. However, this is not a requirement and the centering sleeves may have different heights.

When the piston 5 is pretensioned and is locked, for example, by a piston nut 38, each supporting disk 27 is advanced toward the piston body against the force of the disk springs 33. The spring force of the spring element 35 may be completely disregarded in this process.

The piston ring 25 has a U-shaped cross section and includes holding surfaces 43, 45 defined by supporting segments 39, 41, respectively, proceeding from a jacket portion 37 of the piston ring 25. The holding surfaces 43, 45 engage the upper side and lower sides of the piston body 5a and fix the piston ring 25 axially relative to the piston 5.

Figure 3:
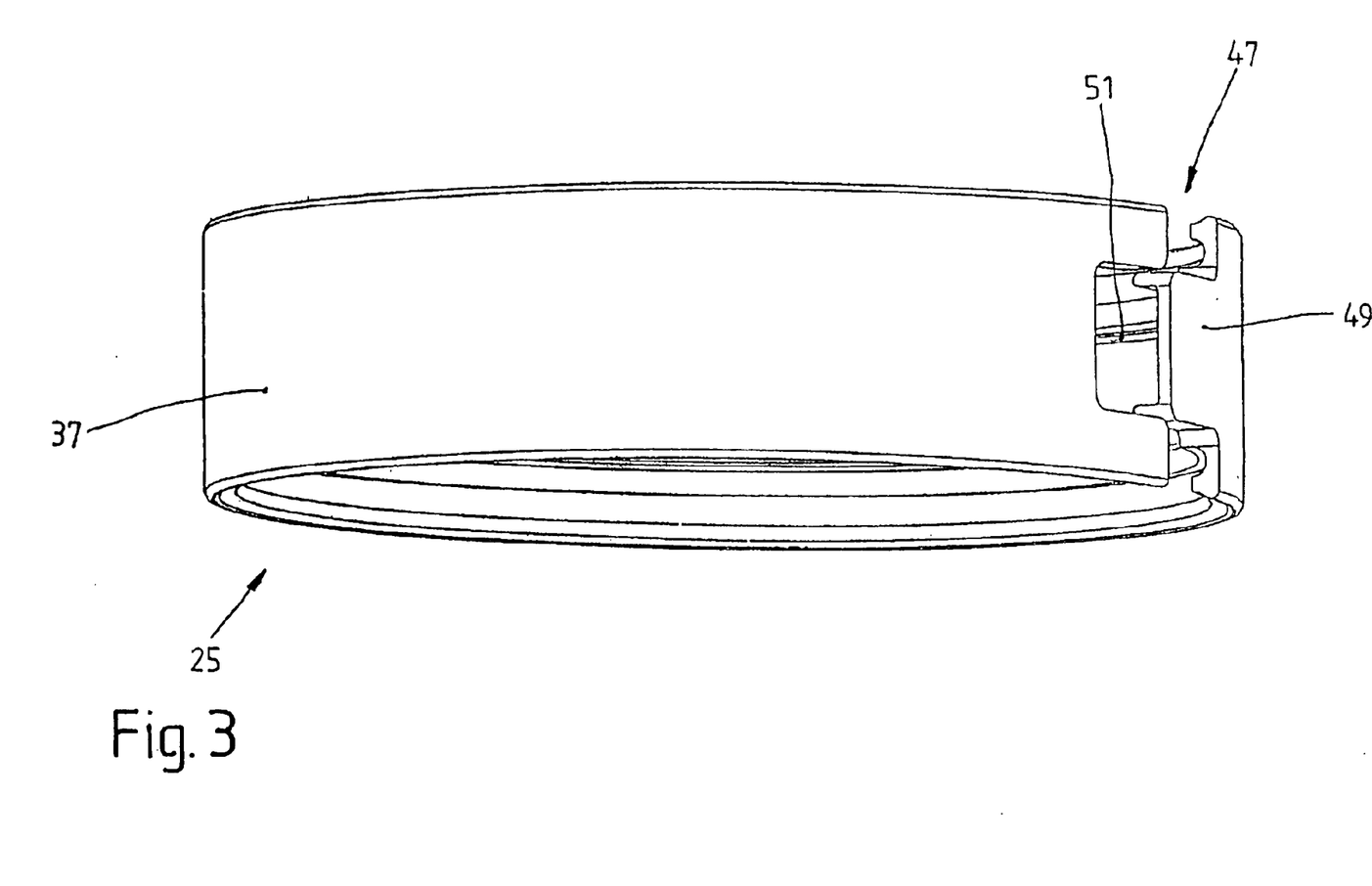
FIG. 3 is a perspective view of a piston ring of the piston of FIG. 2 according to the present invention.

FIG. 3 shows a joint 47 of the piston ring 25 which includes a tongue 49 extending in circumferential direction and a corresponding cutout 51 in which the tongue 49 is received so that the piston ring can expand radially for assembly.

Figure 4:
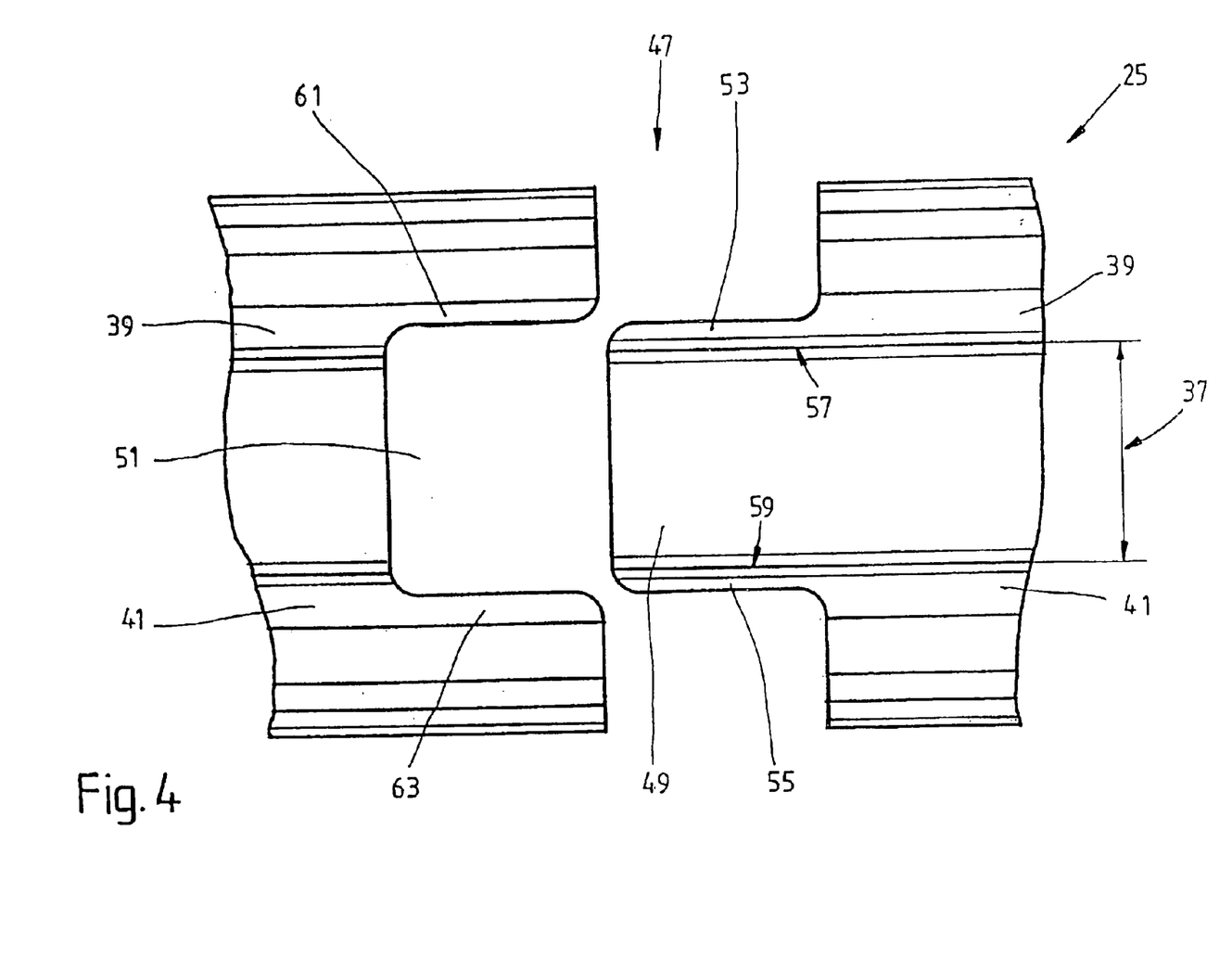
FIG. 4 is a partial view of the piston ring of FIG. 3 from a radially inner side toward a radially outer side in the area of the joint of the piston ring.

FIG. 4 is a view of the piston ring 25 from the radial inner side toward the radial outer side. The supporting segments 39, 41 are constructed at the edges of the jacket portion 37 which covers the outer circumferential surface of the piston 5. The supporting segments 39, 41 of the jacket portion 37 continue in the circumferential direction to the edge of the tongue 42 as holding segments 53, 55 and define holding surfaces 57, 59. The holding segments 53, 55 on the tongue 42 are functionally identical to the supporting segments 39, 41, which are supported at the upper side and lower side of the piston. In this way, the position of the tongue 42 is definitely determined in axial direction of the piston.

Figure 5:
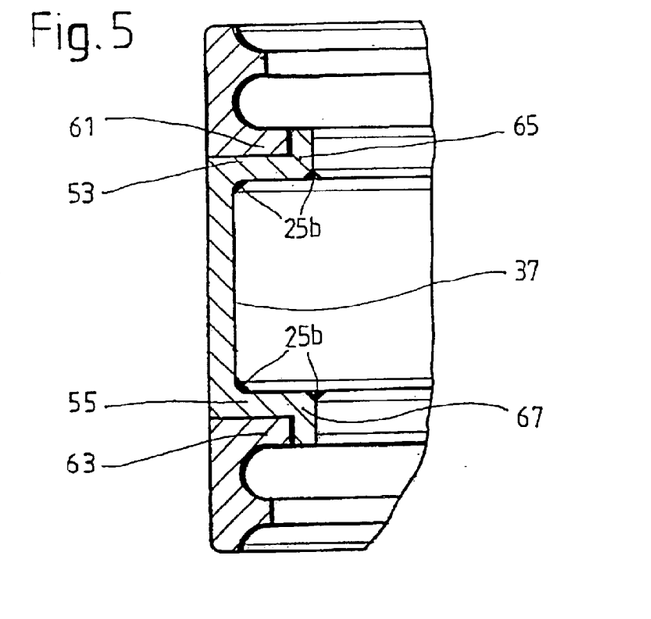
FIG. 5 is a sectional view through the piston ring in the area of the joint.

Carrying segments 61, 63 are arranged at the cutout 51 and extend in the circumferential direction and are supported axially on the holding segments 53, 55 of the tongue 49 when the joint 47 is closed. The carrying segments 61, 63 are constructed at the cutout 51 so that the end of the piston ring 25 with the cutout 51 is also held in a definite axial position relative to the piston 5. This relationship is shown in FIG. 5 in a section through the joint 47. The carrying segments 61, 63 of the cutout 51 which pass into the supporting segments 39, 41 close an axially extending joint between the front end of the tongue 49 and the base of the cutout 51.

Centering webs 65, 67 may also be arranged to engage radially at the carrying segments 61, 63 and accordingly prevent radial expansion of the tongue. The centering webs 65, 67 are constructed at the holding segments 53, 55 on the radial outside proceeding from the tongue 49. When the centering webs 65, 67 are constructed over the entire length of the tongue 49, most of a joint gap in circumferential direction may also be closed.

Figure 6:
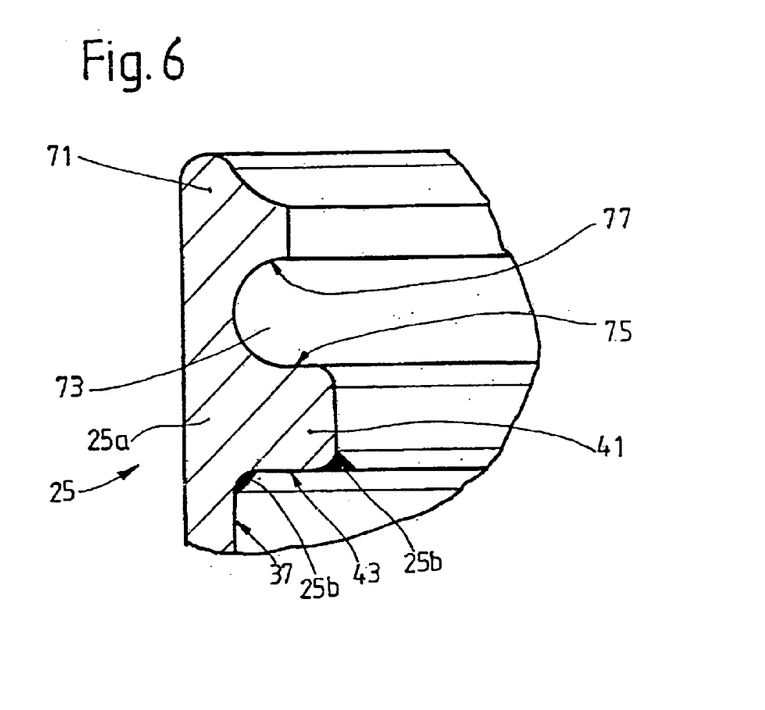
FIG. 6 is a detailed sectional view of the piston ring in the area of a groove for receiving a clamping ring.

FIG. 2 further shows a clamping ring 69 which pretensions a sealing lip 71 of the piston ring 25 on the radial outer side against a wall of the pressure tube 3 (FIG. 2 does not show the pressure tube). FIG. 6 shows the piston ring 25 in the area of a groove 73 in which the clamping ring 69 is accommodated. The clamping ring 69 lies appreciably outside of the outer circumferential surface of the piston 5, so that no design steps are required to be carried out at the piston 5 for the clamping ring 69. The supporting segment 41 forms a first groove side wall 75 of the groove 73. The back of a sealing lip 71 forms a second groove side wall 77 of the groove 73. The distance between the first and second groove side walls 75, 77 is designed to be slightly greater than the diameter of the clamping ring 69, thereby allowing the clamping ring to securely contact the base of the groove 73.

In the detailed view of FIG. 6, the piston ring 25 is shown as comprising a seal carrier 25a and at least one seal 25b. The seal 25b is oriented toward the piston 5 proceeding from the seal carrier 25a. The seal carrier 25a may be produced from an elastic material and the seal 25b may be made of a softer material such as, for example, a TPE. Accordingly, the seal carrier 25a is harder than the seal 25b.

To minimize the leakage gap between the upper side and lower side of the piston 5, the seal 25b may be arranged to contact the upper and/or the lower side of the piston. FIG. 6 shows an embodiment in which the seal 25b extends from the inner diameter of the holding surfaces 43, 45, 57, and 59 of the seal carrier 25a. A sealing lip of the seal 25a which contacts the piston and, as the case may be, is pretensioned by the operating pressure in the work spaces may be formed in a comparatively simple manner.

Alternatively, or in addition, the seal 25b may be arranged on the inner side at the seal carrier 25a at the transition between the holding surface 43 to the jacket portion 37 of the piston ring 25. The piston 5 must be slightly beveled to some degree between its upper/lower side and outer circumferential surface. The seal 25b may be accommodated in the remaining free space. This minimizes any axial play that may exist between the piston ring and piston.

Figure 7:
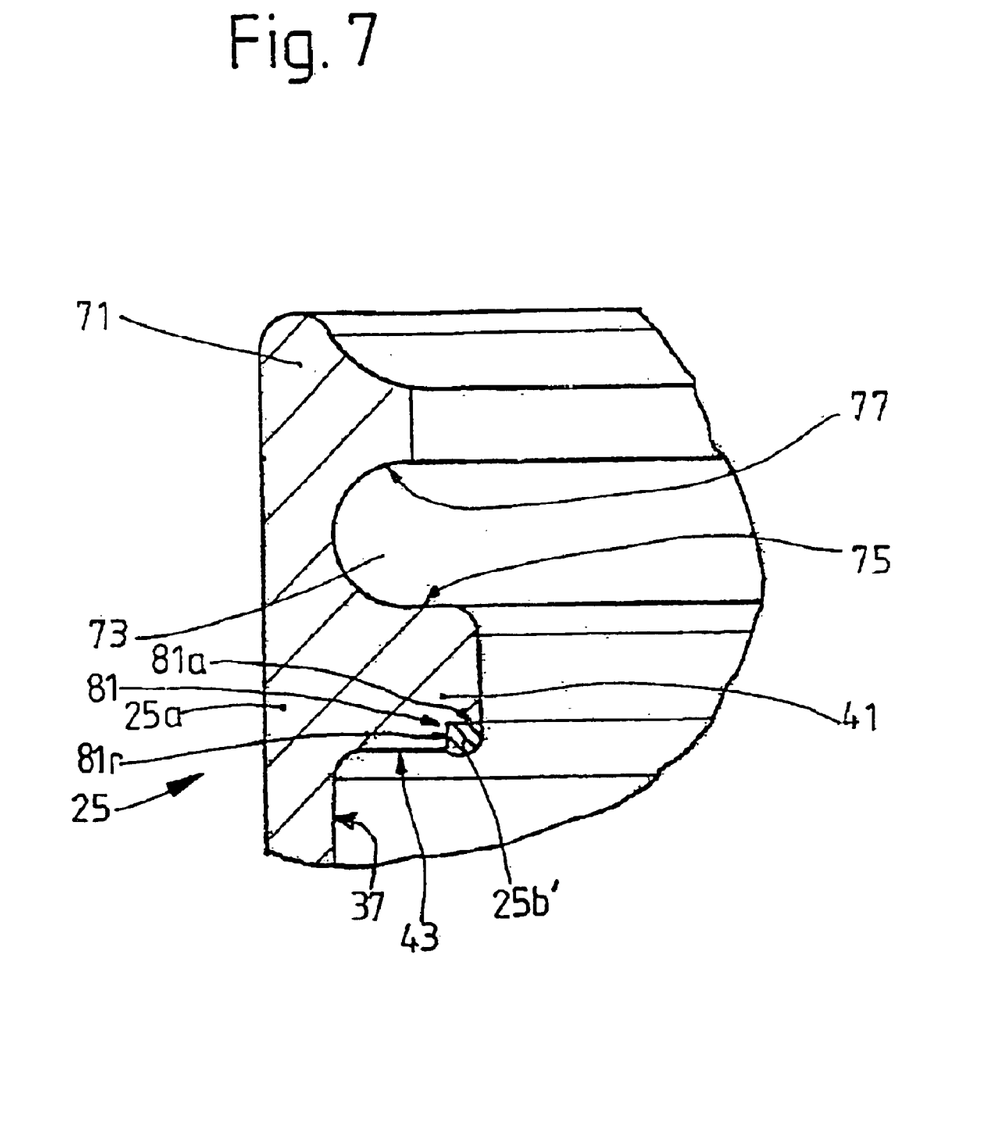
FIG. 7 is a detailed sectional view of another embodiment of the piston ring with an injected seal.

FIG. 7 shows that the seal carrier 25a of the piston ring 25 may have a preferably circumferential shoulder 81 in the area of the supporting element 41 at the transition between the holding surface 43 and the inner diameter of the supporting element. Radial and axial defining surfaces 81r, 81a of the shoulder 81 determine the shape of an injected seal material which forms a seal 25b'. Because of the special construction of the shoulder 81, the sealing material may be injected on the piston ring 25 outside of a completely closed injection die. The seal 25b' need only exert a sealing function in the direction of the upper or lower side of the piston. In spite of the additionally injected seal 25b ', the joint 47 remains at the piston ring 25, thereby ensuring radial elasticity.

Generally, the seal 25b, 25b' may be connected with the seal carrier 25, a by a material bond such as, for example, using gluing or vulcanizing methods. In so doing, a careful selection of the material for the seal carrier and seal must be made because certain combinations of plastics can not be joined in a material bond.

Alternatively, the seal 25b, 25b' may be connected with the seal carrier 25a by a positive engagement. In this alternative embodiment, the seal is produced with a quantity of openings. During the injection of the material to form the seal carrier, the material of the seal carrier is allowed to fill the openings in the seal and accordingly form a positive connection. This obviates that requirement for undercuts at the seal carrier which are difficult to implement with injection molding techniques.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston ring for surrounding a piston of a vibration damper, the piston being a flat disc-shaped piston having an upper side and a lower side and an outer circumferential surface, said piston ring composing:

a jacket portion adapted to surround the outer circumferential surface of the piston;

supporting segments connected to said jacket portion and defining holding surfaces adapted to axially support said jacket portion on the upper and lower sides of the piston, said jacket portion and said supporting segments of the piston ring forming a U-shaped cross-section, where said jacket comprises a base of the U-shaped section, said jacket extending axially by a length that is greater than the axial distance between said supporting segments;

a seal carrier having at least one seal embedded thereon, said at least one seal being oriented to proceed from said seal carrier toward the piston when said jacket portion is supported by said supporting segments on the upper and lower sides of the piston; and a sealing lip arranged on a radially outer side of said piston ring, said sealing lip being arranged on a portion of said jacket extending axially outside of an area between said supporting segments.

2. The piston ring of claim 1, wherein said at least one seal is adapted to contact at least one of the upper side and the lower side of the piston when said jacket portion is supported by said supporting segments on the upper and lower sides of the piston.

3. The piston ring of claim 2, wherein at least one of said supporting segments comprises said seal carrier, said holding surface of said at least one of said supporting segments comprises an inner diameter, and said at least one seal extends from said inner diameter.

4. The piston ring of claim 1, wherein at least one of said supporting segments comprises said seal carrier and said at least one seal is arranged on an inner side of said seal carrier at a transition between said jacket portion and said holding surface of said at least one of said supporting segments.

5. The piston ring of claim 3, wherein said seal carrier comprises a shoulder proximate a transition area between said holding surface and an inner diameter of said supporting element.

6. The piston ring of claim 5, wherein said shoulder is circumferential and defines radial and axial surfaces, said at least one seal comprising injected sealing material having a shape determined by said radial and axial surfaces.

7. The piston ring of claim 1, wherein said at least one seal is connected to the seal carrier by a material bond.

8. The piston ring of claim 1, wherein said at least one seal is connected with the seal carrier by a positive engagement.

* * * * *

UNITED STATES PATENT AND TRADEMARK OFFICE
CERTIFICATE OF CORRECTION

PATENT NO. : 6,863,277 B2
DATED : March 8, 2005
INVENTOR(S) : Peter Wirth et al.

It is certified that error appears in the above-identified patent and that said Letters Patent is hereby corrected as shown below:

<u>Title page,</u>
Insert Item -- [30] Foreign Application Priority Data
                Apr. 19, 2002   (DE)    102 17 650 --.

Signed and Sealed this

Sixth Day of June, 2006

JON W. DUDAS
*Director of the United States Patent and Trademark Office*